(12) United States Patent
Woopen et al.

(10) Patent No.: US 10,286,893 B2
(45) Date of Patent: May 14, 2019

(54) DEVICE FOR OPERATING AN ALL-WHEEL-DRIVE AGRICULTURAL COMMERCIAL VEHICLE

(71) Applicant: Deere & Company, Moline, IL (US)

(72) Inventors: Thomas Woopen, Windeck (DE); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 207 days.

(21) Appl. No.: 15/204,444

(22) Filed: Jul. 7, 2016

(65) Prior Publication Data

US 2017/0008504 A1 Jan. 12, 2017

(30) Foreign Application Priority Data

Jul. 9, 2015 (DE) ........................ 10 2015 212 897

(51) Int. Cl.
*A01B 69/00* (2006.01)
*A01D 46/30* (2006.01)
(Continued)

(52) U.S. Cl.
CPC ........... *B60W 10/119* (2013.01); *B60K 23/08* (2013.01); *B60K 28/16* (2013.01); *B60W 10/02* (2013.01); *B60W 30/1882* (2013.01); *B60W 30/18172* (2013.01); *B60W 50/082* (2013.01); *B60K 2023/0858* (2013.01); *B60W 2300/15* (2013.01);
(Continued)

(58) Field of Classification Search
CPC ........ B60K 6/445; B60K 23/08; B60K 28/16; B60K 2023/0858; Y10S 903/911; B60W 10/119; B60W 30/1882; B60W 50/082; B60W 10/02; B60W 30/18172; B60W 2300/15; B60W 2520/266;
(Continued)

(56) References Cited

U.S. PATENT DOCUMENTS 4,718,515 A 1/1988 Fanti et al.
5,010,974 A * 4/1991 Matsuda ............ B60K 23/0808
180/233

(Continued)

FOREIGN PATENT DOCUMENTS

DE 3536185 A1 4/1987
DE 3621225 C1 5/1987
(Continued)

OTHER PUBLICATIONS

German Search Report issued in counterpart application No. 102015212897.0, dated Feb. 22, 2016 (8 pages).
(Continued)

*Primary Examiner* — Adam D Tissot
*Assistant Examiner* — Aaron C Smith

(57) ABSTRACT

A device for operating an all-wheel-drive agricultural commercial vehicle with a driven rear axle and a front axle that can be engaged for performing an all-wheel-drive mode. A control unit determines, during the all-wheel-drive mode, a front wheel slip parameter that characterizes a drive wheel slip occurring on the front axle of the agricultural commercial vehicle. The control unit deactivates the all-wheel-drive mode independent of the driver if this unit detects that the determined front wheel slip parameter is greater than a specified threshold value.

7 Claims, 3 Drawing Sheets

(51) Int. Cl.
  *B60W 10/119* (2012.01)
  *B60W 30/18* (2012.01)
  *B60W 10/02* (2006.01)
  *B60W 30/188* (2012.01)
  *B60W 50/08* (2012.01)
  *B60K 23/08* (2006.01)
  *B60K 28/16* (2006.01)

(52) U.S. Cl.
  CPC .. *B60W 2520/266* (2013.01); *B60Y 2200/221* (2013.01); *B60Y 2300/18175* (2013.01)

(58) Field of Classification Search
  CPC .... B60Y 2200/221; B60Y 2300/18175; A01B 69/00; A01D 41/141; A01D 46/30
  See application file for complete search history.

(56) References Cited

U.S. PATENT DOCUMENTS

| | | | | |
|---|---|---|---|---|
| 5,126,942 | A * | 6/1992 | Matsuda | B60K 23/0808 180/197 |
| 5,802,489 | A * | 9/1998 | Orbach | B60K 23/08 172/3 |
| 5,850,616 | A * | 12/1998 | Matsuno | B60T 8/175 701/82 |
| 6,007,454 | A * | 12/1999 | Takahira | B60T 8/175 180/197 |
| 6,131,686 | A * | 10/2000 | Scotti | B60K 17/34 180/245 |
| 2011/0276241 | A1* | 11/2011 | Nakao | B60K 6/445 701/69 |
| 2012/0271521 | A1* | 10/2012 | Nordberg | B60K 7/0007 701/69 |

FOREIGN PATENT DOCUMENTS

| | | |
|---|---|---|
| DE | 3744215 A1 | 7/1989 |
| DE | 4022088 A1 | 1/1992 |
| DE | 4138366 A1 | 7/1993 |
| DE | 19647507 A1 | 5/1998 |
| EP | 2730447 A1 | 5/2014 |

OTHER PUBLICATIONS

European Search Report in foreign counterpart application No. 16177890.7, dated Nov. 14, 2016 (6 pages).

* cited by examiner

DEVICE FOR OPERATING AN ALL-WHEEL-DRIVE AGRICULTURAL COMMERCIAL VEHICLE

RELATED APPLICATION

This application claims the benefit of German Application Ser. No. 102015212897.0, filed on Jul. 9, 2015, which is hereby expressly incorporated by reference in its entirety.

FIELD OF THE DISCLOSURE

The present disclosure relates to a device for operating an all-wheel-drive agricultural commercial vehicle with a driven rear axle and a front axle that can be engaged for performing an all-wheel-drive mode.

BACKGROUND

Such a device emerges, for example, from EP 2 730 447 A1. The device constructed as a drive control system for a commercial vehicle comprises a power transfer unit for driving the front and rear wheels of the commercial vehicle by means of a drive engine, as a well as a switchover device, which makes it possible to switch between an all-wheel-drive mode in which both the front wheels and also the rear wheels of the commercial vehicle are driven and a two-wheel-drive mode in which only its rear wheels are driven. The switchover is performed here independent of the driver according to a wheel slip detected for the rear wheels. The wheel slip is detected based on a current forward motion speed of the commercial vehicle derived from position information of a GPS module, in which this speed is compared with a theoretically expected forward motion speed of the commercial vehicle that is given from the rotational speed of the drive engine, the gear ratio of a vehicle transmission, and the wheel circumference of the rear wheels. If the wheel slip determined in this way is greater than a given threshold value, the drive control system activates the all-wheel-drive mode by closing an electro-hydraulically actuatable coupling.

On the other hand, the drive control system deactivates the all-wheel-drive mode by opening the hydraulically actuatable coupling and reverts to the two-wheel-drive mode as soon as the detected wheel slip is less than or equal to a specified threshold value and the commercial vehicle is simultaneously located on an essentially non-inclined surface. In addition, a deactivation of the all-wheel-drive mode is also provided for the case of elevated forward motion speeds of the commercial vehicle greater than 20 km/h. The scope in which the front wheels are actually engaged in the driving task during the all-wheel-drive mode is, in contrast, not taken into account. The all-wheel-drive mode is therefore also maintained in situations in which, for example, due to reduced wheel vertical forces on the front wheels, there is no longer sufficient ground contact by the associated front tires.

Therefore, the problem of the present disclosure is to disclose a device of the type specified above that is improved with respect to the criteria used for the driver-independent deactivation of an all-wheel-drive mode.

SUMMARY

The device for operating an all-wheel-drive agricultural commercial vehicle comprises a driven rear axle and a front axle that can be engaged for performing an all-wheel-drive mode. During the all-wheel-drive mode, a control unit determines a front wheel slip parameter which characterizes the drive wheel slip occurring on the front axle of the agricultural commercial vehicle, wherein the control unit deactivates the all-wheel-drive mode independent of the driver when this unit detects that the determined front wheel slip parameter $\mu$ is greater than a specified threshold value $\mu_{lim}$.

Through suitable specification of the threshold value $\mu_{lim}$, it can be avoided that the drive of the front axle is maintained in situations in which, for example, due to reduced wheel vertical forces in the area of the front axle, there is no longer sufficient ground contact by the associated front tires. Churning up the ground when driving over fields or green areas, as well as excessive wear of the front tires when driving on streets, can be reliably prevented in this way.

This may also be the case when the front axle is not loaded due to back-loaded driving conditions for the agricultural commercial vehicle. In agricultural commercial vehicles built as tractors, such conditions typically occur while plowing or driving with accessories or attachments connected in the rear area.

The device is, in particular, a part of an engine or transmission management system of the agricultural commercial vehicle. An internal combustion engine built as a diesel engine is connected to a vehicle transmission via a crankshaft. The vehicle transmission comprises a rear axle transmission output connected to the rear axle and also associated rear wheels, as well as a front axle transmission output that can be engaged via an all-wheel-drive coupling and can be connected in this way to the front axle and associated front wheels.

Thus, the drive connection to the front axle is broken by opening the all-wheel-drive coupling without any action by the driver, as soon as it is detected during the all-wheel-drive mode that an increased drive wheel slip has occurred on the front tires.

In the simplest case, the control unit calculates the front wheel slip parameter $\mu$ from the ratio between the instantaneous driving speed v of the agricultural commercial vehicle as well as a wheel circumferential speed $v_v$ occurring on the front axle during the all-wheel-drive mode, $$\mu = \frac{v_v - v}{v_v}$$

Here, the control unit determines the wheel circumferential speed $v_v$ occurring on the front axle from the known, previously specified tire circumference of the front wheels as a function of an associated wheel rotational speed $n_v$.

The instantaneous driving speed v can be derived, for example, by detecting the time position changes of the agricultural commercial vehicle. These changes are provided to the control unit by a GPS navigation system in the form of corresponding position information.

Because not every agricultural commercial vehicle has a GPS navigation system available, an option for determining the front wheel slip parameter $\mu$ that is not dependent of that system is desirable. A reliable indicator for the drive wheel slip occurring on the front wheels is the ratio of the drive powers $P_v$, $P_h$ between the front axle and rear axle during the all-wheel-drive mode. This ratio is ideally on the order of magnitude of 40/60. Lower values indicate reduced traction of the front tires and thus a corresponding increase of the drive wheel slip on the front axle. Alternatively, the control unit can therefore derive the front wheel slip parameter μ from the ratio of computationally determined drive powers $P_v$, $P_h$ between the front axle and rear axle during the all-wheel-drive mode. The threshold value $\mu_{lim}$ corresponding to the activation of the all-wheel-drive mode is, in this case, specified on the order of magnitude of 20/80 to 30/70.

For the computational determination of the drive power $P_v$ of the front axle, there is the option that the control unit determines the drive moment $M_v$ applied to the front axle. In particular, the drive power $P_v$ is then given by multiplying the drive moment $M_v$ with the wheel rotational speed $n_v$, $$P_v = 2\pi \cdot n_v \cdot M_v.$$

The drive moment $M_v$ applied to the front axle can be detected by means of an associated torque sensor. The torque sensor is typically constructed as an arrangement of multiple strain gauges for detecting a torque occurring on the front axle due to the drive moment. Alternatively, the detection of the torque on the front axle can also be realized by means of a magnetoelastisc method in which a magnetic field change caused by the torsion on a ferromagnetic section of the front axle is detected and evaluated by means of associated magnetic field sensors.

If a pressure-controlled all-wheel-drive coupling is provided for engaging the front axle, it is also conceivable that the control unit determines a coupling pressure p applied at the slip point of the all-wheel-drive coupling by modulating the coupling closure, and the drive moment $M_v$ transmitted via the all-wheel-drive coupling to the front axle is derived from a breakaway torque corresponding to the determined coupling pressure p.

The all-wheel-drive coupling is closed in an unpressurized state and connects the front axle transmission output of the vehicle transmission to the front axle or a front axle differential driving the front wheels.

Typically, the actuation of the all-wheel-drive coupling on the side of the control unit is electrohydraulic. For this purpose, the all-wheel-drive coupling can be loaded by means of an electrically controllable proportional valve with pressurized hydraulic fluid from a hydraulic supply system of the agricultural commercial vehicle.

At the slip point, the applied coupling pressure p is essentially proportional to the drive moment $M_v$ transmitted from the all-wheel-drive coupling to the front axle. By modulating the pressure p to be applied and thus the coupling closure, the slip point can be reliably recognized with reference to a drop of the output-side rotational speed $n_a$ relative to the input-side rotational speed $n_b$ of the all-wheel-drive coupling. Because the rotational speed sensors required for this purpose are normally already present, this arrangement produces an economical option for determining the drive power $P_v$ of the front axle.

More specifically, the pressure is applied successively until the slip point is reached, wherein the coupling pressure p applied at the slip point is determined by evaluating the associated electrical valve control current I. Then the applied coupling pressure p is broken down again and the all-wheel-drive coupling reverts to its closed state.

The slip point is determined at regular time intervals during the all-wheel-drive mode, wherein the time intervals are selected, in particular, such that an overheating of the all-wheel-drive coupling is excluded. The time intervals may be in the range of a few minutes.

For a known drive power $P_v$ of the front axle, the drive power $P_h$ of the rear axle can be derived without additional means from the total drive power $P_g$ provided by the diesel engine and corrected with respect to incidental transmission losses, $$P_h = P_g - P_v.$$

The (uncorrected) total drive power provided by the diesel engine is given from the instantaneous engine operating point and can be determined by the control unit by reading out an engine characteristic curve stored in an engine control module.

Conversely, the control unit can evaluate a drive wheel slip occurring on the rear axle for driver-independent activation of the all-wheel-drive mode. Here, the control unit compares the instantaneous driving speed v of the agricultural commercial vehicle with a wheel circumferential speed $v_h$ occurring on the rear axle. The latter is given from the known, previously specified tire circumference of the rear wheels as a function of an associated wheel rotational speed $n_h$.

For the already mentioned case that the agricultural commercial vehicle has no GPS navigation system available, the instantaneous driving speed v can also be derived from either radar, for example, or the wheel rotational speeds $n_v$ of the front wheels that run freely during the deactivated all-wheel-drive mode. If the drive wheel slip occurring on the rear axle or a rear wheel slip parameter μ' characterizing this condition is greater than a corresponding specified threshold value $\mu'_{lim}$, then the control unit activates the all-wheel-drive mode independent of the driver by closing the all-wheel-drive coupling.

Additionally or alternatively, the control unit can evaluate the drive wheel slip occurring on the rear axle according to a percentage engine workload related to the instantaneous driving speed v of the agricultural commercial vehicle. Thus, when a value on the order of magnitude of 70% is reached, it can be determined that there is an increased need for drive power and thus a corresponding increase of the drive wheel slip on the rear axle. The percentage engine workload related to the instantaneous driving speed v of the agricultural commercial vehicle can here be determined by the control unit from the instantaneous engine operating point by reading out the engine characteristic curve stored in the engine control module.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
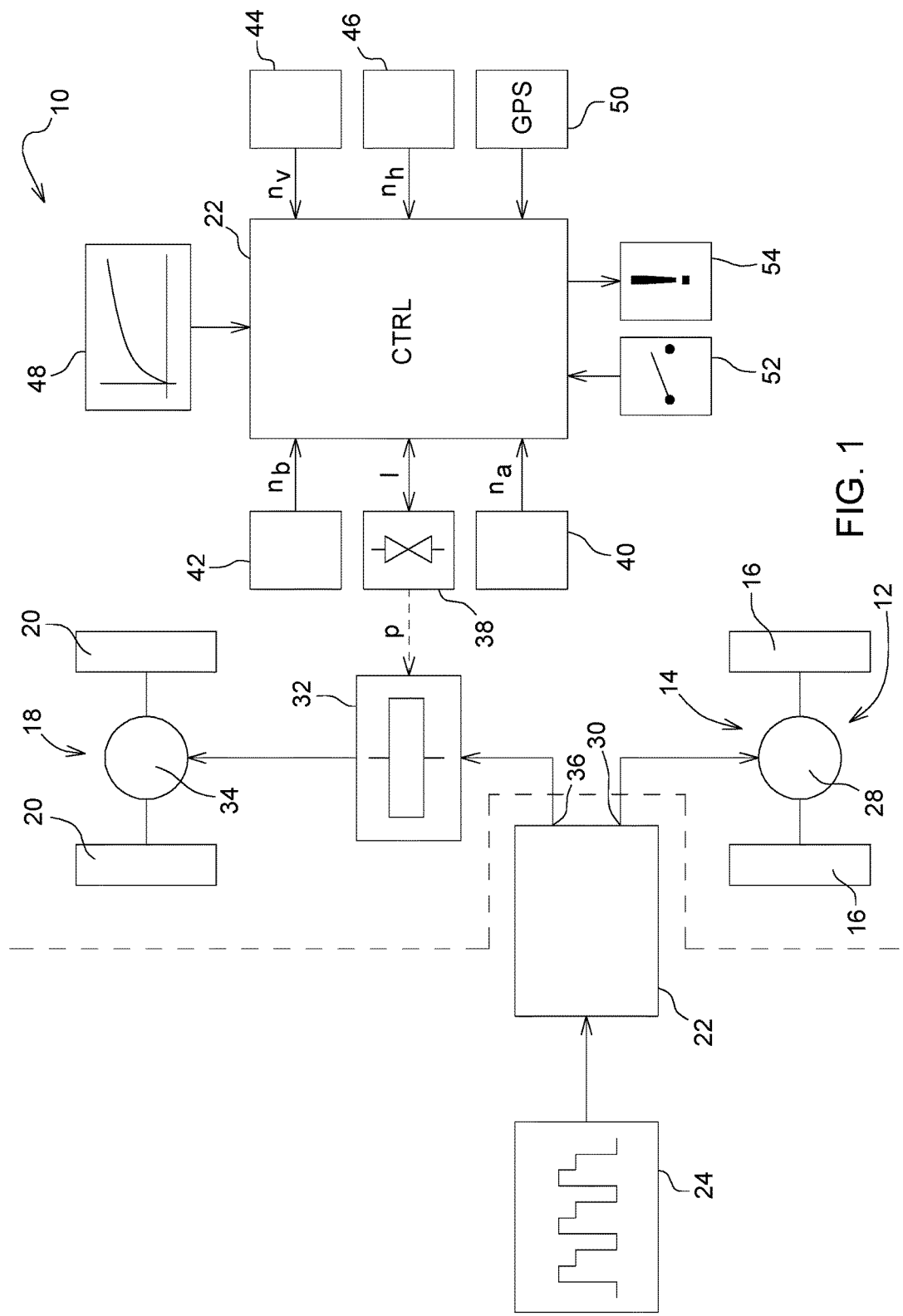
FIG. 1 is a view of an embodiment of the device for operating an all-wheel-drive agricultural commercial vehicle.

FIG. 1 shows an embodiment of the device according to the disclosure for operating an all-wheel-drive agricultural commercial vehicle.

The device 10 is part of a higher-level engine or transmission management system of the agricultural commercial vehicle, wherein the agricultural commercial vehicle can be, for example, an all-wheel-drive tractor 12. The device 10 comprises a driven rear axle 14 with rear wheels 16 and a front axle 18 that can be engaged for performing an all-wheel-drive mode with steerable front wheels 20. A microprocessor-controlled control unit 22 is used for coordinating the all-wheel-drive mode, including activation or deactivation performed independent of the driver.

An internal combustion engine constructed as a diesel engine 24 is connected to a vehicle transmission 26 via a crankshaft. The vehicle transmission 26 comprises a rear axle transmission output 30 connected to the rear axle 14 via a rear axle differential 28 and also a front axle transmission output 36 that can be engaged via a pressure-controlled all-wheel-drive coupling 32 and can be connected in this way via a front axle differential 34 to the front axle 18.

The actuation of the all-wheel-drive coupling 32 on the part of the control unit 22 is realized electro-hydraulically. For this purpose, the all-wheel-drive coupling 32 can be loaded by means of an electrically controllable proportional valve 38 with pressurized hydraulic fluid from a not-shown hydraulic supply system of the tractor 12. A first and second rotational speed sensor 40 and 42, respectively, connected to the control unit 22 is used for detecting a rotational speed $n_a$ and $n_b$, respectively, applied to the all-wheel-drive coupling 32 on the input side and output side, respectively.

Wheel rotational speed sensors 44 and 46 may be allocated to the front and rear wheels 20 and 16 of the tractor 12 and may be used for detecting associated wheel rotational speeds $n_v$ and $n_h$, respectively, wherein the rotational speed signals generated by the wheel rotational speed sensors 44 and 46 are fed to the control unit 22 for evaluation in addition to the signals of the first and second rotational speed sensors 40 and 42, respectively.

In addition, the control unit 22 receives information with respect to the instantaneous engine operating point of the diesel engine 24. The preparation is realized on the side of an engine control module 48. A GPS navigation system 50 is furthermore used for determining the position of the tractor 12.

An actuation element 52 in the form of a switch permits a manual activation or deactivation of the all-wheel-drive mode, wherein the driver is informed about the respective activation state of the device 10 by means of a display element 54. The actuation element 52 is, for example, a mechanical switch, however, in the case of a graphical user interface, a software implementation in the form of a control superimposed on a touchscreen is also conceivable.

Figure 2:
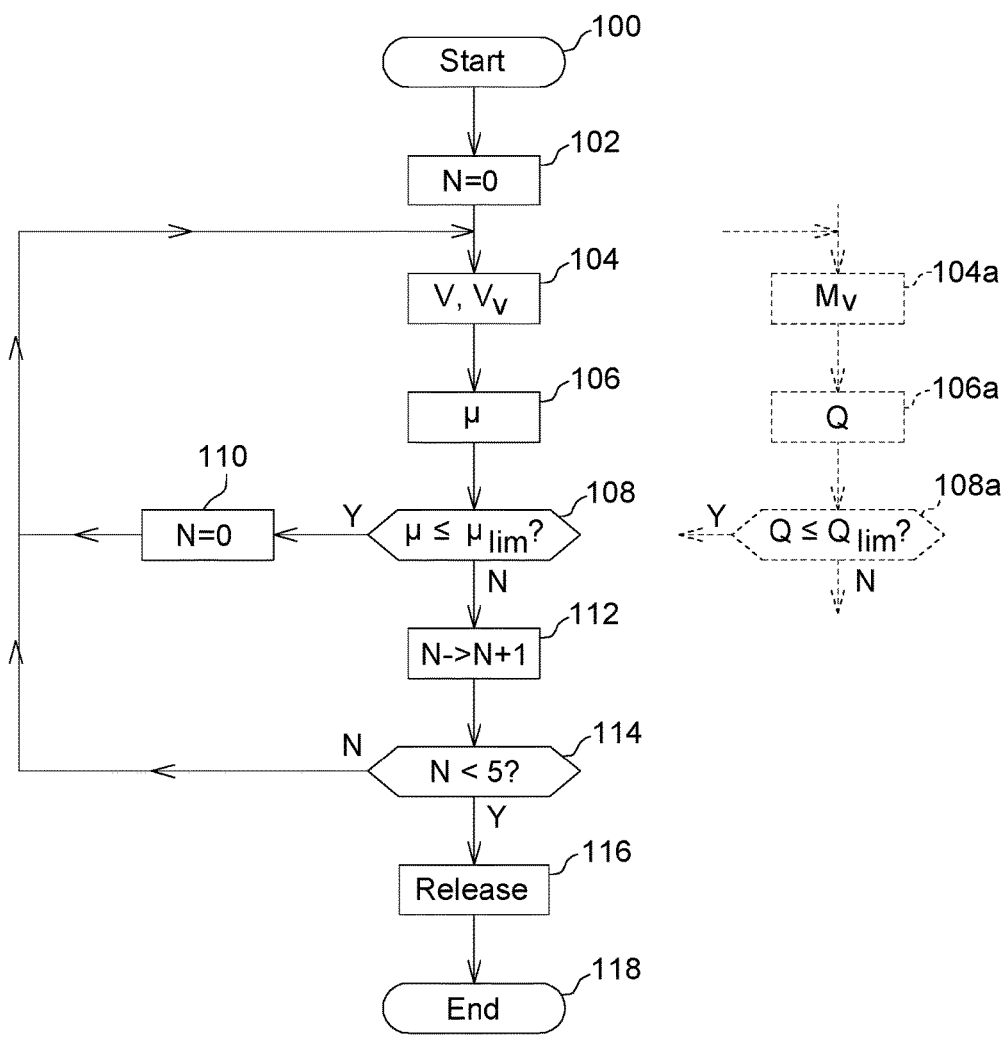
FIG. 2 is a flow chart representative of a method for deactivating an all-wheel-drive mode executed by the device shown in FIG. 1.

FIG. 2 shows a flow chart that represents a method for deactivating an all-wheel-drive mode executed by the device shown in FIG. 1.

When an activated all-wheel-drive mode is detected, the method performed by the control unit 22 is initialized in a starting step 100, wherein, in a first step 102, the control unit 22 sets a counter N to the value zero.

In a subsequent second step 104, the instantaneous driving speed v of the tractor 12 relative to the ground is determined. The instantaneous driving speed v of the tractor 12 is derived by the control unit 22 by detecting time position changes of the tractor 12. The latter are made available to the control unit 22 on the part of the GPS navigation system 50 in the form of corresponding position information.

In addition, in the second step 104, the control unit 22 determines a wheel circumferential speed $v_v$ occurring on the front axle 18 from the known, previously specified tire circumference of the front wheels 20 as a function of the wheel rotational speed $n_v$ detected by means of the wheel rotational speed sensors 44.

The speeds v and $v_v$ determined in the second step 104 are used in a third step 106 for calculating a front wheel slip parameter μ that characterizes a drive wheel slip occurring on the front axle 18 of the tractor 12, in that the ratio between the instantaneous driving speed v of the tractor 12 as well as the wheel circumferential speed $v_v$ occurring on the front axle 18 during the all-wheel-drive mode is formed, $$\mu = \frac{v_v - v}{v_v}$$

In a fourth step 108, the control unit 22 compares the calculated front wheel slip parameter μ with a specified threshold value $\mu_{lim}$. If the front wheel slip parameter μ is less than or equal to the specified threshold value $\mu_{lim}$, then the process continues with a fifth step 110, in which the counter N is again assigned the value zero. Then the method returns to the second step 104.

In the fourth step 108, if the control unit 22 detects that the front wheel slip parameter μ is greater than the specified threshold value $\mu_{lim}$, then the counter N is increased in a sixth step 112 by the value one. Then, in a seventh step 114 it is checked whether the counter N has reached the value five. If this is the case, the control unit 22 deactivates the all-wheel-drive mode independent of the driver by opening the all-wheel-drive coupling 32, where the proportional valve 38 is controlled electrically in a corresponding way in an eighth step 116. Then the method is ended in a closing step 118.

In contrast, if it is determined in the seventh step 114 that the counter N is less than the value five, the method returns to the second step 104.

Through suitable specification of the threshold value $\mu_{lim}$, it can be avoided that the drive of the front axle 18 is maintained in situations in which, for example, due to reduced wheel vertical forces in the area of the front axle 18, there is no longer sufficient ground contact of the front tires of the tractor 12. Churning up of the ground while driving on fields or green areas, as well as excessive wear of the front tires in the case of driving on streets, can be reliably prevented in this way.

This may also be the case for an unloading of the front axle 18 due to back-loaded driving conditions of the tractor 12. Such conditions typically occur while plowing or while driving with accessories or attachments connected in the rear area.

In this way, the drive connection to the front axle 18 is broken, without any action by the driver, by opening the all-wheel-drive coupling 32 as soon as it is determined during the all-wheel-drive mode that an increased drive wheel slip is occurring on the front tires.

For the case that the tractor 12 has no GPS navigation system 50 available, a different procedure for determining the front wheel slip parameter μ is provided below.

Accordingly, in an alternative second step 104a, the control unit 22 initially determines the drive moment $M_v$ applied to the front axle 18 of the tractor 12. Here, the control unit 22 performs a targeted modulation of the coupling closure of the all-wheel-drive coupling 32 with the goal of determining the respective slip point; the slip point represents the breakaway moment of the all-wheel-drive coupling 32 and thus the drive moment $M_v$ transmitted via the all-wheel-drive coupling 32 to the front axle 18.

At the slip point, the applied coupling pressure p is essentially proportional to the drive moment $M_v$ transmitted from the all-wheel-drive coupling 32 to the front axle 18; consequently, it can be determined directly. The all-wheel-drive coupling 32 is closed in the unpressurized state, wherein the applied coupling pressure p is increased successively by corresponding energization of the proportional valve 38 until, with reference to a drop in the output-side rotational speed $n_a$ relative to the input-side rotational speed $n_b$ of the all-wheel-drive coupling 32, it is detected that the slip point has been reached. Then the control unit 22 determines the coupling pressure p applied at the slip point and, with this, the drive moment $M_v$ corresponding to the associated breakaway torque, by evaluating an associated electrical valve control current I. Then the applied coupling pressure p is removed and the all-wheel-drive coupling 32 is returned to its closed state.

It shall also be noted that the use of separate rotational speed sensors 40 and 42 is not required for determining the slip point, because a drop of the output-side rotational speed $n_a$ relative to the input-side rotational speed $n_b$ of the all-wheel-drive coupling 32 can also be derived from a comparison of the wheel rotational speeds $n_v$ and $n_h$ detected by the two wheel rotational speed sensors 44 and 46 between the front axle and rear axle 18 and 14.

The slip point is determined at equal time intervals during the all-wheel-drive mode, and indeed for each new execution of the method shown in FIG. 2. The time intervals are selected in the area of a few minutes such that overheating of the all-wheel-drive coupling 32 is ruled out.

The drive moment $M_v$ determined in the alternative second step 104a forms, in a subsequent alternative third step 106a, the basis for the computational determination of the drive power $P_v$ of the front axle 18. The drive power $P_v$ of the front axle 18 is then given by multiplying the drive moment $M_v$ with the wheel rotational speed $n_v$, $$P_v = 2\pi \cdot n_v \cdot M_v.$$

The drive power $P_v$ calculated in this way is simultaneously used for deriving the drive power $P_h$ of the rear axle 14, wherein this drive power is subtracted from the total drive power $P_g$ provided by the diesel engine 24 and corrected with respect to the incidental transmission losses, $$P_h = P_g - P_v.$$

The (uncorrected) total drive power $P_g$ provided by the diesel engine 24 is here given from the instantaneous engine operating point and is determined by the control unit 22 by reading out an engine characteristic curve stored in the engine control module 48.

The control unit 22 then determines the ratio of the drive powers $P_v$, $P_h$ between the front axle and rear axle 18 and 14. The ratio formed in this way represents a reliable indicator for the drive wheel slip occurring on the front wheels 20 during the all-wheel-drive mode and is ideally on the order of magnitude of 40/60. Lower values indicate reduced traction of the front tires and thus a corresponding increase of the drive wheel slip on the front axle 18. The control unit 22 therefore derives the front wheel slip parameter μ in the alternative third step 106a from the ratio Q of the computationally determined drive powers $P_v$, $P_h$ between the front axle and rear axle 18 and 14 during the all-wheel-drive mode. The threshold value $Q_{lim}$ corresponding to the activation of the all-wheel-drive mode is specified in an alternative fourth step 108 on the order of magnitude of 20/80 to 30/70.

Therefore, if it is detected in the alternative fourth step 108a that the ratio Q of the drive powers $P_v$, $P_h$ between the front axle and rear axle 18 and 14 is greater than the specified threshold value $Q_{lim}$, then it is determined that there is an increased drive wheel slip on the front axle 18, so that the process continues with the sixth step 112. Otherwise, after performing the fifth step 110, the method returns to the second step 104 to perform this step again.

Deviating from the previously described procedure, a direct detection of the drive moment $M_v$ by means of a torque sensor (not shown in FIG. 1) could also be realized. The torque sensor is typically constructed as an arrangement of multiple strain gauges for detecting a torsion occurring on the front axle 18 as a function of the drive torque.

Figure 3:
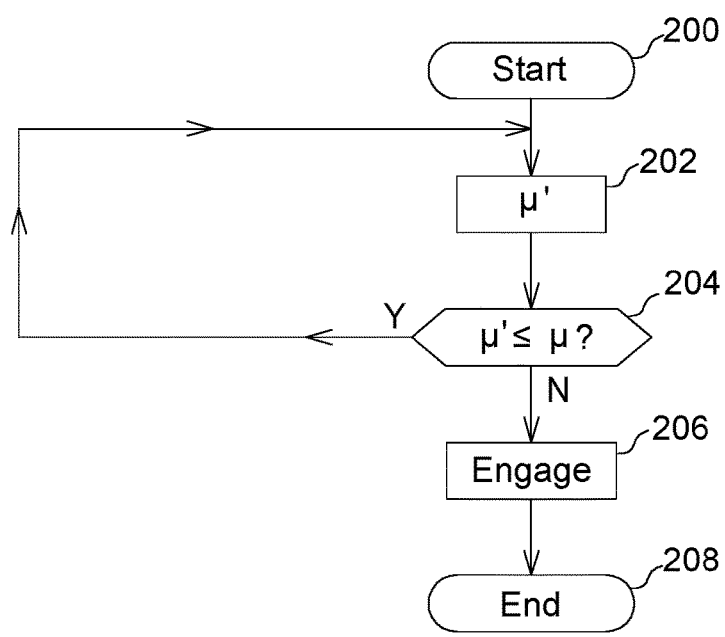
FIG. 3 is a flow chart that represents a method for activating an all-wheel-drive mode that can be executed by the device shown in FIG. 1.

FIG. 3 further shows a flow chart that represents a method for activating the all-wheel-drive mode that can be executed by the device shown in FIG. 1.

The method performed by the control unit 22 is initialized when a deactivated all-wheel-drive mode is detected in a starting step 200.

In a first step 202, the control unit 22 evaluates a drive wheel slip occurring on the rear axle 14. For this purpose, the control unit 22 compares the instantaneous driving speed v of the tractor 12 with a wheel circumferential speed $v_h$ occurring on the rear axle 14. The latter is given from the known, previously specified tire circumference of the rear wheels 16 as a function of the associated wheel rotational speed $n_h$. For evaluating the drive wheel slip, a rear wheel slip parameter μ' characterizing this condition is calculated, $$\mu' = \frac{v_h - v}{v_h}$$

For the already mentioned case that the tractor 12 has no GPS navigation system 50 available, the instantaneous driving speed v is derived from the wheel rotational speeds $n_v$ of the front wheels 20 running freely during the deactivated all-wheel-drive mode.

If it is determined in a second step 204 that the rear wheel slip parameter is greater than a correspondingly previously specified threshold value $\mu'_{lim}$, the control unit 22 activates the all-wheel-drive mode in a third step 206 independent of the driver by closing the all-wheel-drive coupling 32. Otherwise, the method reverts to the first step 202.

Additionally, in the second step 204, the drive wheel slip occurring on the rear axle 14 may be evaluated according to a percentage engine workload relative to the instantaneous driving speed v of the tractor 12. Thus, when a value on the order of magnitude of 70% is reached, it can be determined that there is an increased need for drive power and thus a corresponding increase in the drive wheel slip on the rear axle 14. The percentage engine workload related to the instantaneous driving speed v of the tractor 12 is here determined by the control unit 22 from the instantaneous engine operating point by reading out the engine characteristic curve stored in the engine control module 48. The method is ended in a closing step.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for operating an all-wheel-drive agricultural commercial vehicle, comprising:
    a driven rear axle and a front axle engageable for performing an all-wheel-drive mode;
    a pressure-controlled coupling for engaging the front axle; and
    a control unit configured to determine during the all-wheel-drive mode a front wheel slip parameter ($\mu$), the front wheel slip parameter being a function of a drive wheel slip occurring on the front axle of the agricultural commercial vehicle;
    wherein, the control unit detects a coupling slip point by modulating a closure of the coupling, the coupling slip point being a point at which an output-side rotational speed of the coupling is lower than an input-side rotational speed of the coupling;
    further wherein, in response to detecting the coupling slip point, the control unit determines a coupling pressure (p) applied at the coupling slip point;
    further wherein, the control unit determines a drive moment ($M_v$) transmitted via the coupling to the front axle, from the coupling pressure (p), for computing the drive power ($P_v$) of the front axle;
    further wherein, the control unit deactivates the all-wheel-drive mode independent of a driver input if the determined front wheel slip parameter ($\mu$) is greater than a specified threshold value ($\mu_{lim}$).

2. The device of claim 1, wherein the control unit calculates the front wheel slip parameter ($\mu$) from the ratio between an instantaneous driving speed of the agricultural commercial vehicle and a wheel circumferential speed on the front axle during the all-wheel-drive mode.

3. The device of claim 1, wherein the control unit determines the front wheel slip parameter ($\mu$) from the ratio of a computed drive powers ($P_v$, $P_h$) between the front and rear axles during the all-wheel-drive mode.

4. The device of claim 1, wherein the coupling slip point is determined at time intervals during the all-wheel-drive mode.

5. The device of claim 1, wherein the control unit evaluates a drive wheel slip occurring on the rear axle for a driver-independent activation of the all-wheel-drive mode.

6. The device of claim 5, wherein the control unit evaluates the drive wheel slip on the rear axle as a function of a percentage engine workload related to the instantaneous driving speed (v) of the agricultural commercial vehicle.

7. An all-wheel-drive agricultural commercial vehicle, comprising:
    a driven rear axle and a front axle engageable for performing an all-wheel-drive mode;
    a pressure-controlled coupling for engaging the front axle; and
    a control unit configured to determine during the all-wheel-drive mode a front wheel slip parameter ($\mu$), the front wheel slip parameter being a function of a drive wheel slip occurring on the front axle of the agricultural commercial vehicle;
    wherein, the control unit detects a coupling slip point by modulating a closure of the coupling, the coupling slip point being a point at which an output-side rotational speed of the coupling is lower than an input-side rotational speed of the coupling;
    further wherein, in response to detecting the coupling slip point, the control unit determines a coupling pressure (p) applied at the coupling slip point;
    further wherein, the control unit determines a drive moment ($M_v$) transmitted via the coupling to the front axle, from the coupling pressure (p), for computing the drive power ($P_v$) of the front axle;
    further wherein, the control unit deactivates the all-wheel-drive mode independent of a driver input if the determined front wheel slip parameter ($\mu$) is greater than a specified threshold value ($\mu_{lim}$).

* * * * *